(12) United States Patent
Gotoh et al.

(10) Patent No.: US 6,219,260 B1
(45) Date of Patent: Apr. 17, 2001

(54) MOTOR DRIVING CIRCUIT WITH FILTER CONDENSERS

(75) Inventors: Masaki Gotoh; Takashi Wakabayashi, both of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/499,386

(22) Filed: Feb. 7, 2000

(30) Foreign Application Priority Data

Jun. 8, 1999 (JP) .................................................. 11-160328

(51) Int. Cl.[7] .................................................. H02M 1/12
(52) U.S. Cl. ............................................ 363/41; 363/144
(58) Field of Search ..................................... 363/410, 144; 318/811, 128, 599

(56) References Cited

U.S. PATENT DOCUMENTS 5,602,451 * 2/1997 Kohge et al. ........................ 318/293
5,625,265 * 4/1997 Vlahu ................................... 318/254

FOREIGN PATENT DOCUMENTS 2749514   2/1998   (JP) .

* cited by examiner

*Primary Examiner*—Shawn Riley
(74) *Attorney, Agent, or Firm*—Sughrue, Mion, Zinn, Macpeak & Seas, PLLC

(57) ABSTRACT

A PWM driving circuit for a brushless motor is provided on an insulating film formed on a base board made of metal. Grounding the base board, filter condensers are formed between the base board and wiring patterns in which driving currents for the driving coils flow. The capacitances of the condensers are optimized by adjusting the film thickness of the insulating film or by changing the shapes of the wiring patterns or the like.

11 Claims, 2 Drawing Sheets

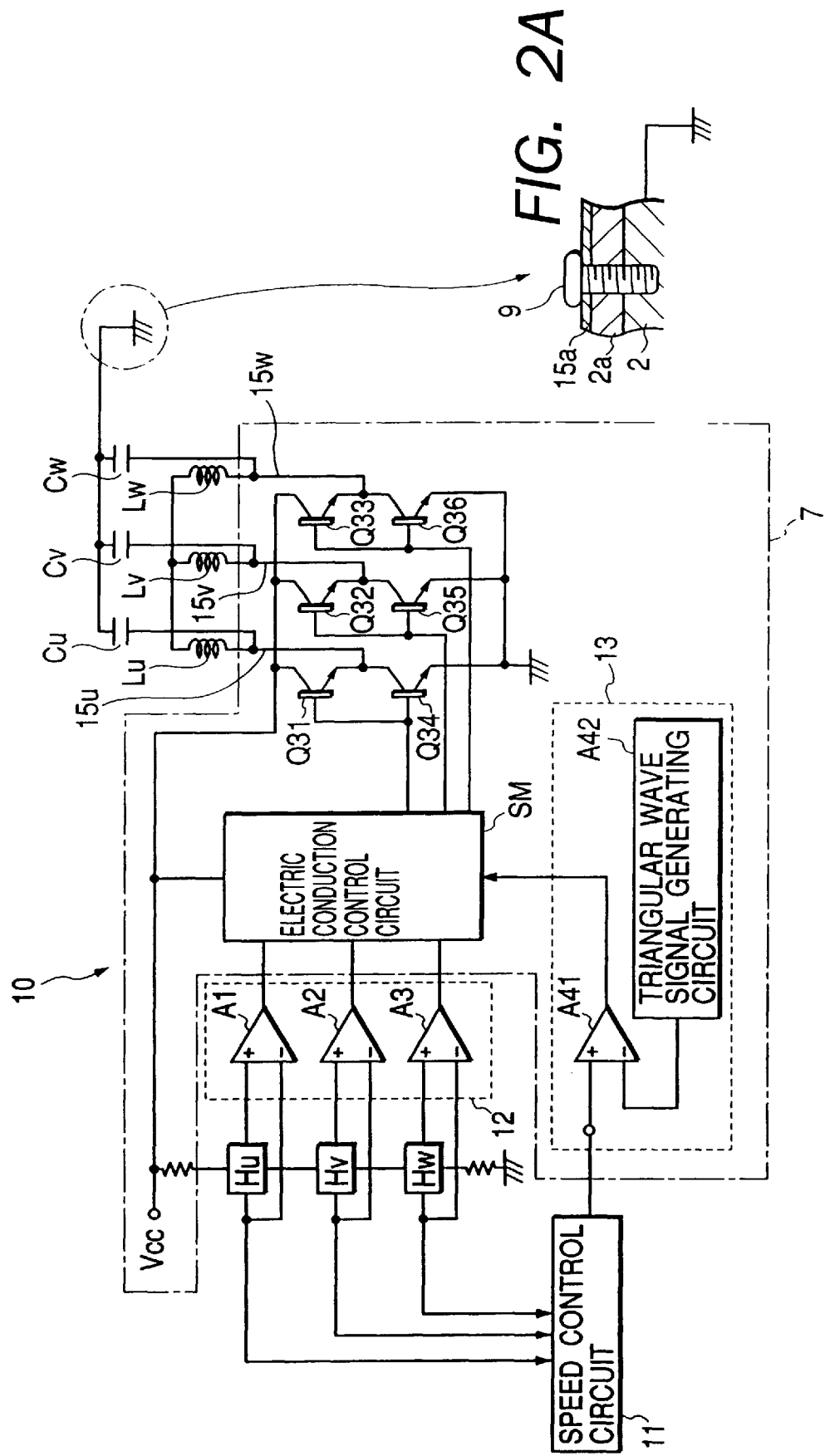

MOTOR DRIVING CIRCUIT WITH FILTER CONDENSERS

BACKGROUND OF THE INVENTION

The present invention relates to a motor driving circuit having a PWM driving circuit for changing an on-off ratio of a pulse signal so as to control driving currents flowing in plural phases of driving coils. Particularly, the present invention relates to a motor driving circuit which can prevent the influence of high frequency noise generated in a PWM driving circuit.

There is known a motor driving circuit having a PWM driving circuit for changing an on-off ratio of a pulse signal so as to control driving currents applied to plural phases of driving coils. In such a motor driving circuit, the frequency of the pulse signal in the PWM driving circuit is usually set to be a high frequency of dozens kHz or more. In addition, the changes of currents in the PWM driving circuit, that is, the leading and trailing edges of currents are made sharp. Thus, high frequency noise is generated from the PWM driving circuit.

When this high frequency noise gets into a circuit section other than the motor driving circuit, the driving currents flowing into the driving coils fluctuate, thereby causing a malfunction of the motor. In the related art, any of the following measures is taken to avoid such a harmful influence.

First, the PWM driving circuit is shielded to prevent high frequency noise from radiation. Second, the changes of the currents are made gentle enough to restrain high frequency components from being generated, so that high frequency noise generated in the circuit is itself lowered. Third, a snubber circuit (for example, filter condensers) for absorbing noise is added into a circuit in which a current having a sudden change flows, so that high frequency components are absorbed by this snubber circuit.

However, any of the measures has its own problem. First, in the method in which the PWM driving circuit is shielded, it costs much to provide a shield. In addition, it is impossible to give a perfect shield to the PWM driving circuit.

Second, in the method to make the changes of the currents gentle, the loss in driving transistors connected to the driving coils increases so that the efficiency deteriorates. In addition, since the loss increases, large-capacity ones must be adopted as those transistors. Such transistors are so expensive as to increase the cost of the driving circuit.

Third, in the case where a snubber circuit is provided for absorbing noise, it is necessary to add new electric/electronic elements to the driving circuit, so that the cost of the driving circuit is likewise increased. In addition, it is necessary to give careful consideration onto the characteristics of elements to be used in the snubber circuit, in order to be able to absorb high frequency noise satisfactorily.

SUMMARY OF THE INVENTION

It is therefore an object of the present invention to provide a motor driving circuit having a novel configuration which can prevent the aforementioned problems and which can restrain the influence of high frequency noise generated in a PWM driving circuit.

In order to achieve the above object, according to the present invention, there is provided a motor driving circuit comprising:

a base board having electric conductivity;

an insulating film formed on the base board;

a PWM driving circuit formed on the insulating film for controlling driving currents flowing into plural phases of driving coils of the motor;

conductive patterns formed on the insulating film and including paths in which the driving currents flow; and connector for connecting the base board and a low impedance portion of the conductive patterns such that filter condensers are formed between the base board and the paths.

Preferably, the capacitances of the respective filter condensers are determined by adjusting width of a part of the conductive patterns.

Preferably, the capacitances of the respective filter condensers are determined by adjusting at least one of thickness and material of the insulating film.

Preferably, the low impedance portion is either a portion having a ground potential or a portion having a power supply potential of the motor driving circuit.

Preferably, the connector is a fastening member for short-circuiting the low impedance portion and the base board.

Preferably, one of the ends of the respective film condensers are individually connected to the plural phases of the driving coils, and the other ends thereof are connected to the base board in common.

According to the present invention, there is also provided a method of preventing high frequency noise generated from a PWM driving circuit of a motor driving circuit, comprising the steps of:

preparing a base board having electric conductivity;

forming an insulating film on the base board;

forming the PWM driving circuit on the insulating film for controlling driving currents flowing into plural phases of driving coils of the motor;

forming conductive patterns including paths in which the driving currents flow on the insulating film;

selecting a portion having low impedance out of the conductive patterns; and connecting the low impedance portion and the base board to form filter condensers between the base board and the paths.

Preferably, the capacitances of the respective filter condensers are determined by adjusting width of a part of the conductive patterns.

Preferably, the capacitances of the respective filter condensers are determined by adjusting at least one of thickness and material of the insulating film.

Preferably, the low impedance portion and the base board are connected by a fastening member.

According to the present invention, it is not necessary to provide a special shield to a PWM driving circuit in order to restrain the influence of high frequency noise. It is therefore possible to get rid of the cost of the shield. In addition, in comparison with the case where a shield is given to the PWM driving circuit, it is possible to restrain the influence of high frequency noise.

In addition, it is not necessary to make the change of currents gentle. It is therefore possible to reduce the loss in driving transistors. In accordance therewith, small-capacitance and low-cost ones can be used as those transistors.

Furthermore, according to the present invention, the characteristics of condensers can be set desirably by adjusting the film thickness of an insulating film, the shapes of wiring patterns, or the like. It is therefore possible to form filter condensers having characteristics suitable for an adopted PWM driving circuit.

BRIEF DESCRIPTION OF THE DRAWINGS

In the accompanying drawings:

FIG. 2 is a block diagram showing a schematic configuration of the motor driving circuit. and FIG. 2A is a partial section side view of the wiring pattern forming a ground potential.

DETAILED DESCRIPTION OF THE PREFERRED EMBODIMENTS

Figures 1A, 1B:
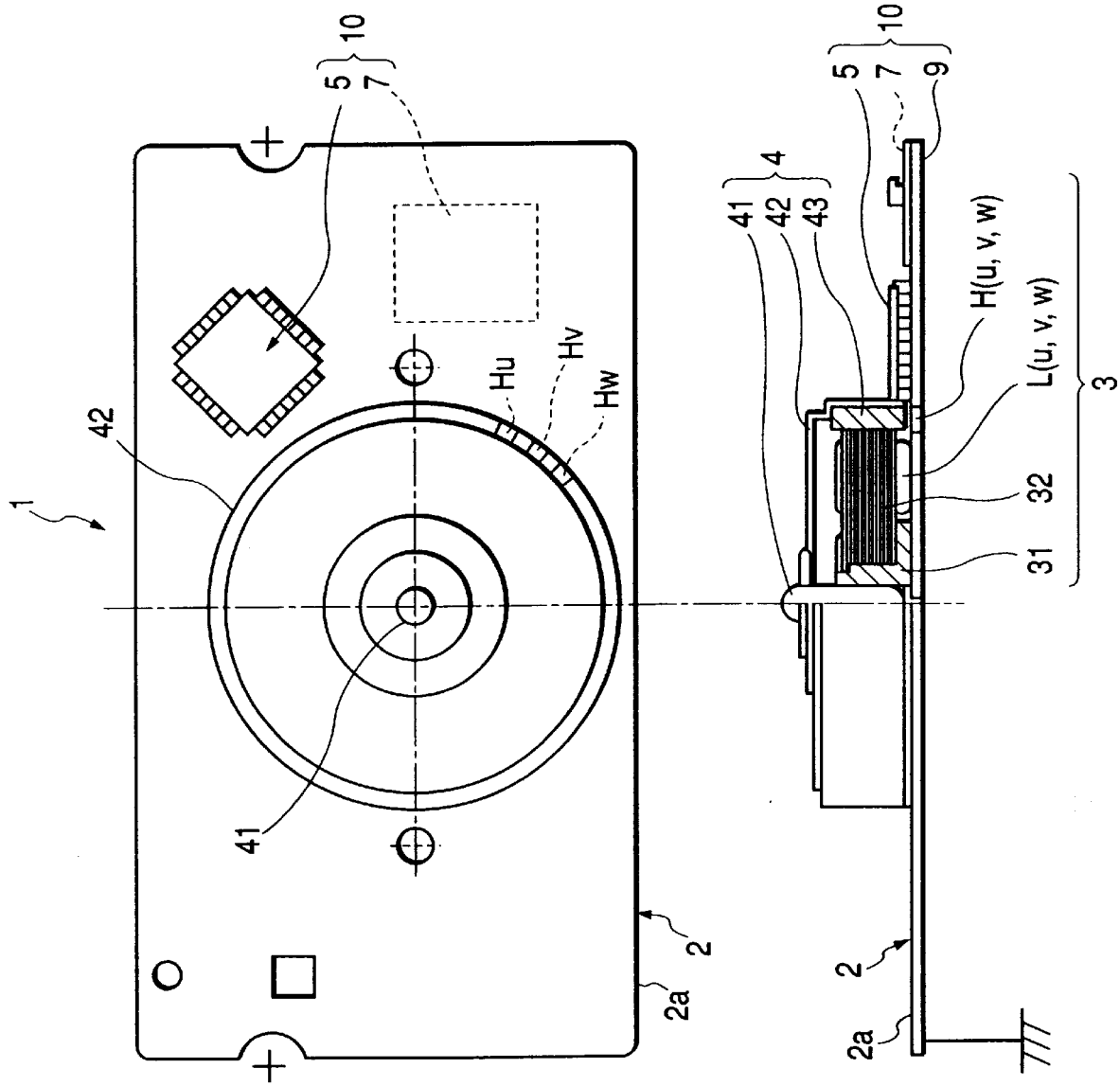
FIG. 1A is a plan view showing a mechanical configuration of a brushless motor mounted with a motor driving circuit to which the present invention has been applied.
FIG. 1B is a partial section side view of the brushless motor.

A brushless motor mounted with a motor driving circuit to which the present invention has been applied will be described below with reference to the drawings.

FIGS. 1A and 1B show a general configuration of a brushless motor. A brushless motor 1 of this embodiment has a base board 2 made of metal such as iron or aluminum with electric conductivity, a stator assembly 3 fixed to this base board 2, a rotor assembly 4 supported rotatably on this stator assembly 3, and a motor driving circuit 10.

The stator assembly 3 has a cylindrical bearing 31 fixed to the base board 2, a stator core 32 attached to the outer circumference of this bearing 31, and three phases of driving coils Lu, Lv and Lw wound on a plurality of salient poles formed on this stator core 32.

On the other hand, the rotor assembly 4 has a rotor shaft 41 supported rotatably on the bearing 31 through a bearing surface formed on the inner circumferential surface of the bearing 31, a cup-like rotor casing 42 fixed to this rotor shaft 41, and a ring-like rotor magnet 43 fixed to the inner circumferential surface of the circumferential wall of the rotor casing 42.

Further, three hall devices Hu, Hv and Hw which act as magnetic pole sensors are arranged in a circumferential order on a portion of the base board 2 in opposition to the board-side annular end surface of the rotor magnet 43. The positions of magnetic poles are detected on the basis of the outputs of these hall devices.

Here, an insulating film 2a with a fixed thickness is formed on the surface of the base board 2. A wiring pattern formed of conductor foil, such as copper foil, or the like, is formed on the surface of this insulating film 2a. A driving IC 5 and the hall devices Hu, Hv and Hw are mounted at predetermined positions on the wiring pattern respectively.

A PWM driving circuit 7 which will be described later in detail is formed by mounting a plurality of electric/electronic elements on the wiring pattern. In this embodiment, the motor driving circuit 10 is constituted by the PWM driving circuit 7 and circuits incorporated in the package of the driving IC 5.

FIG. 2 is a block diagram showing a schematic configuration of the motor driving circuit. The motor driving circuit 10 has a speed control circuit 11, an amplifier section 12 and the PWM driving circuit 7. The speed control circuit 11 generates an error signal on the basis of the output signals from the respective hall devices Hu, Hv and Hw so as to rotate the rotor assembly 4 at an aimed speed. The amplifier section 12 includes amplifiers A1, A2 and A3 for amplifying the output signals from the respective hall devices Hu, Hv and Hw. The PWM driving circuit 7 changes an on-off ratio of a pulse signal (PWM signal) so as to control the driving currents following in the three phases of driving coils Lu, Lv and Lw. The circuits 11 and 12 except the PWM driving circuit 7 are incorporated in the package of the driving IC 5.

Signals outputted from the respective hall devices Hu, Hv and Hw are supplied to the amplifiers A1, A2 and A3 of the circuit 12, and amplified therein, respectively. The amplified signals are supplied to an electric conduction control circuit SM of the PWM driving circuit 7.

In addition, the output signals from the respective hall devices Hu, Hv and Hw are supplied also to the speed control circuit 11. In the speed control circuit 11, a rotation speed signal corresponding to the rotation speed of the rotor assembly 4 is generated from the output signals from the respective hall devices Hu, Hv and Hw. In addition, an error signal between this rotation speed signal and a signal for making the rotor assembly 4 rotate at a target speed (target speed signal) is generated. This error signal is supplied to a pulse width modulating circuit 13 of the PWM driving circuit 7.

The pulse width modulating circuit 13 has a comparator A41 and a triangular wave signal generating circuit A42. The error signal and a triangular wave signal from the triangular wave signal generating circuit A42 are supplied to the comparator A41. The error signal and the triangular wave signal are compared with each other in the comparator A41 so as to be converted into a pulse signal (PWM signal) with a predetermined on-off ratio. This PWM signal is supplied to the electric conduction control circuit SM.

The electric conduction control circuit SM is constituted by logic circuits, by which the output signals from the respective amplifiers A1, A2 and A3 are combined with one another to generate a switching signal. In addition, the switching operations of driving transistors Q31 to Q36 associated with the respective phases are controlled by this generated switching signal and the PWM signal. As a result, the driving currents controlled by the on-off ratio of the PWM signal are supplied to the driving coils Lu, Lv and Lw, so as to control the speed of the rotor assembly 4.

In FIG. 2A, a part of a wiring pattern 15a forming a ground potential (zero volt line) of the motor driving circuit 10 is short-circuited with the base board 2 through a screw 9. This ground potential is included in a low impedance portion of the motor driving circuit 10. The portion short-circuited with the base board 2 may be a part of a wiring pattern forming not the ground potential but a power supply potential. Then, the base board 2 formed of metal is grounded on a chassis of a not-shown main body of an apparatus or the like. The connecting member for short-circuiting the base board 2 with the low impedance portion may be a rivet, a lead wire, a connector, a flexible printed board, or the like, other than the screw 9.

When the base board 2 is thus connected to the low impedance portion of the motor driving circuit 10, filter condensers with predetermined capacitances can be formed by adjusting the thickness or material of the insulating film 2a, the shapes (line width or the like) of the wiring patterns, the material of conductor foil forming the wiring patterns, or the like.

In the motor driving circuit 10 in this embodiment, by use of such adjustment, filter condensers Cu, Cv and Cw are formed between the base board 2 and wiring patterns 15u, 15v and 15w in which driving currents for the driving coils Lu, Lv and Lw flow.

That is, the shapes or line widths of the wiring patterns 15u, 15v and 15w or the film thickness or material of the insulating film 2a under the wiring patterns 15u, 15v and 15w is adjusted to form filter condensers Cu, Cv and Cw set to have predetermined capacitances. As shown in FIG. 2, one ends of these filter condensers Cu, Cv and Cw are connected to the driving coils Lu, Lv and Lw individually and respectively while the other ends are connected to the base board 2 in common.

With such a configuration, high frequency noise generated in the PWM driving circuit 7 is absorbed by the filter condensers Cu, Cv and Cw. Incidentally, the film thickness of the insulating film 2a or the shapes of the wiring patterns 15u, 15v and 15w should be, by their nature, set in accordance with the capacitances of the filter condensers 15u, 15v and 15w to be formed.

Thus, in the motor driving circuit 10, high frequency noise generated in the PWM driving circuit 7 is absorbed so that it is not necessary to give a special shield to the driving circuit 7 in order to prevent radiation of high frequency noise. It is therefore possible to get rid of the cost of the shield, so that it is possible to lower the cost of the motor driving circuit. In addition, in comparison with the case where a shield is given to the PWM driving circuit 7, it is possible to restrain the influence of high frequency noise on the driving current.

In addition, it is not necessary to make gentle the leading and trailing edges of currents supplied to the driving transistors Q31 to Q36. It is therefore possible to reduce the loss in the driving transistors Q31 to Q36. In addition, as the loss in the driving transistors Q31 to Q36 can be reduced, small capacitance and low price ones can be used as the driving transistors Q31 to Q36.

Further, in the motor driving circuit 10, the capacitances (characteristics) of the condensers Cu, Cv and Cw can be optimized by adjusting the film thickness of the insulating film 2a or by changing the shapes of the wiring patterns or the like. Accordingly, it is not necessary to give consideration to elements used in other circuits though such consideration would be necessary when a snubber circuit for absorbing noise were added. If a snubber circuit were added, it would be necessary to consider the allowable ripples, withstand voltage, and so on, of elements constituting the circuit. In the motor driving circuit according to the present invention, however, such consideration becomes unnecessary because the characteristics of the condensers can be optimized on the basis of the film thickness of the insulating film, the shapes of the wiring patterns, or the like.

Furthermore, since the electric/electronic elements constituting the PWM driving circuit 7 are mounted on the base board 2, heating of those elements can be radiated effectively through the base board 2. As a result, those which are small in allowable loss can be used as those elements, so that the cost of the elements can be reduced.

Incidentally, as the driving transistors Q31 to Q36, semiconductor switching elements such as field-effect transistors, thyristors, or the like, may be used instead of bipolar transistors. In addition, the filter condensers may be formed anywhere if they can absorb high frequency noise there satisfactorily.

As has been described, according to the present invention, it is not necessary to provide a special shield to a PWM driving circuit in order to restrain the influence of high frequency noise. It is therefore possible to get rid of the cost of the shield. In addition, in comparison with the case where a shield is given to the PWM driving circuit, it is possible to restrain the influence of high frequency noise.

In addition, it is not necessary to make the change of currents gentle. It is therefore possible to reduce the loss in driving transistors. In accordance therewith, small-capacitance and low-cost ones can be used as those transistors.

Furthermore, according to the present invention, the characteristics of condensers can be set desirably by adjusting the film thickness of an insulating film, the shapes of wiring patterns, or the like. It is therefore possible to form filter condensers having characteristics suitable for an adopted PWM driving circuit.

What is claimed is:

1. A motor driving circuit comprising:
    a base board made of metal;
    an insulating film formed on a surface of the base board;
    a PWM driving circuit formed on a surface of the insulating film for controlling driving currents flowing into plural phases of driving coils of a motor, the PWM driving circuit including conductive patterns having patterns in which the driving currents flow, and a low impedance portion; and
    a connector for connecting the metal base board and the low impedance portion to provide the metal base board a potential determined by the low impedance portion,
    wherein filter condensers are formed by the patterns, the metal base board connected to the low impedance portion, and the insulating film formed between the patterns and the base board, said filter condensers for absorbing high frequency noise generated in the PWM driving circuit.

2. The motor driving circuit as set forth in claim 1, wherein a capacitance of the respective filter condensers is determined by adjusting a width of a part of the conductive patterns.

3. The motor driving circuit as set forth in claim 1, wherein a capacitance of the respective filter condensers is determined by adjusting at least one of a thickness and a material of insulating film.

4. The motor driving circuit as set forth in claim 1, wherein the low impedance portion is at a potential selected from one of a ground potential and a power supply potential of the motor driving circuit.

5. The motor driving circuit as set forth in claim 1, wherein the connector is a fastening member for short-circuiting the low impedance portion and the base board.

6. The motor driving circuit as set forth in claim 1, wherein an end of the respective filter condensers is individually connected to the plural phases of the driving coils, and wherein an opposite end thereof is connected to the base board in common.

7. A motor driving circuit comprising:

a base board having electric conductivity;

an insulating film formed on the base board;

a PWM driving circuit formed on the insulating film for controlling driving currents flowing into plural phases of driving coils of a motor;

conductive patterns formed on the insulating film and including paths in which the driving currents flow, said conductive patterns having a low impedance portion; and a connector for connecting the base board to said low impedance portion of the conductive patterns such that filter condensers are formed between the base board and the paths, wherein the connector is a fastening member for short-circuiting the low impedance portion and the base board.

8. The motor driving circuit as set forth in claim 7, wherein a capacitance of the respective filter condensers is determined by adjusting a width of a part or the conductive patterns.

9. The motor driving circuit as set forth in claim 7, wherein a capacitance of the respective filter condensers is determined by adjusting at least one of a thickness and a material of the insulating film.

10. The motor driving circuit as set forth in claim 7, wherein the low impedance portion has a potential selected from one of a ground potential or a power supply potential of the motor driving circuit.

11. The motor driving circuit as set forth in claim 10, wherein a capacitance of the respective filter condensers is determined by adjusting at least one of a thickness and a material of the insulating film.

\* \* \* \* \*